United States Patent [19]
White et al.

[11] Patent Number: 5,374,436
[45] Date of Patent: Dec. 20, 1994

[54] APPARATUS AND METHOD FOR MAKING A MULTI-FLAVORED FROZEN CONFECTION

[76] Inventors: Neal E. White, 64 Ogle Rd., Old Tappan, N.J. 07675; Kenneth D. Margolis, 10 Cedar Hollow Dr., Rose Valley, Pa. 19086

[21] Appl. No.: 169,319

[22] Filed: Dec. 17, 1993

Related U.S. Application Data

[63] Continuation-in-part of Ser. No. 129,452, Sep. 29, 1993, abandoned.

[51] Int. Cl.$^5$ .............................. A23G 9/00; A23P 1/00
[52] U.S. Cl. ........................................... 426/249; 62/75; 62/345; 62/356; 426/279; 426/515; 426/524
[58] Field of Search ............... 426/249, 279, 282, 100, 426/101, 515, 524; 62/1, 75, 340, 345, 356; 425/126.2

[56] References Cited

U.S. PATENT DOCUMENTS

| | | | |
|---|---|---|---|
| 1,429,405 | 9/1922 | Carter et al. | 426/249 |
| 2,246,871 | 6/1941 | Balch | 426/249 |
| 2,498,645 | 2/1950 | Bobby | 62/75 |
| 2,674,960 | 4/1954 | DePasquale | 426/282 |
| 2,747,525 | 5/1956 | Lund | 426/249 |
| 2,925,052 | 2/1960 | Glass | 62/340 |
| 2,975,732 | 3/1961 | Pasquale | 426/249 |
| 3,274,958 | 9/1966 | Otken | 426/279 |
| 3,576,113 | 4/1971 | Swett et al. | 62/75 |
| 3,971,853 | 7/1976 | Crowder | 426/249 |
| 3,974,300 | 8/1976 | Roberts et al. | 426/101 |
| 4,104,411 | 8/1978 | Pooler | 426/515 |
| 4,542,028 | 9/1985 | Butcher et al. | 426/101 |
| 4,548,045 | 10/1985 | Altares et al. | 62/345 |
| 4,752,197 | 6/1988 | Getman | 62/345 |
| 4,986,080 | 1/1991 | Grigoli et al. | 62/345 |
| 5,011,704 | 4/1991 | Smagula et al. | 426/100 |
| 5,085,059 | 2/1992 | Grigoli et al. | 62/345 |

*Primary Examiner*—George Yeung
*Attorney, Agent, or Firm*—Lerner, David, Littenberg, Krumholz & Mentlik

[57] ABSTRACT

A system and method for making a frozen confection having a plurality of differently flavored or colored sections are provided. After partially freezing in a mold the ingredients for a first flavor or color to form a frozen outer layer and a liquid inner core, the liquid inner core is vacuumed from the mold. A carving tool, such as a laser, then is inserted into the area of the mold previously occupied by the liquid inner core. The carving tool removes a portion of the frozen outer layer in accordance with a predetermined pattern. The ingredients for a second flavor or color then are inserted into the mold to fill the inner core and the areas of the outer layer removed with the carving tool. The mold then is subjected to freezing to form the final product.

28 Claims, 3 Drawing Sheets

APPARATUS AND METHOD FOR MAKING A MULTI-FLAVORED FROZEN CONFECTION

This application is a continuation-in-part of application Ser. No. 08/129,452 filed Sep. 29, 1993, now abandoned, the entirety of which is incorporated herein by reference.

BACKGROUND OF THE INVENTION

This invention pertains to apparatus and methods for making frozen confections, and, more particularly, to apparatus and methods for making frozen confections having a plurality of differently flavored or colored sections.

Apparatus for manufacturing frozen confections generally comprises a plurality of molds affixed to a conveyor or rotary table for moving the molds through various processing stations. These stations conventionally comprise: (a) a filing station where the molds are filled with ingredients in liquid form; (b) a stick-inserting station where sticks are inserted into the molds; (c) a freezing station where the molds are subjected to temperatures below freezing to cause solidification of the liquid ingredients; and (d) a product-withdrawing station where the frozen confections are removed from the molds. As a final step, in some cases, the frozen confections are dipped into a bath comprising the ingredients of a coating (e.g., chocolate).

Frozen confections comprising more than one flavor or color also are known. U.S. Pat. No. 2,747,525 to Lund discloses a method and apparatus for manufacturing such a product. In Lund, the molds are filled with a first ingredient in liquid form and then immersed in a brine solution having a temperature below freezing. Before the inner core of the product freezes, this portion is vacuumed out of the mold. A second ingredient in liquid form then is injected into the mold, and the mold again is immersed in the brine solution. The resultant product is a frozen confection comprising an outer layer of one flavor or color and an inner core of a second flavor or color. Using the Lund System, however, the second flavor or color is not visible to the consumer, except at the product's base.

U.S. Pat. No. 3,971,853 to Crowder discloses an apparatus and method for making a frozen confection having a plurality of different flavors or colors. Crowder, however, uses a complicated arrangement of nozzles within the molds which deliver different ingredients to different sections of the molds. Using the Crowder system, moreover, the ingredients are intermingled such that the different flavors or colors do not form distinct sections.

U.S. Pat. No. 1,429,405 to Carter et al. discloses a method for making a frozen confection having a plurality of differently flavored or colored sections. In Carter, a dye or punch is used to remove a portion of the frozen confection after the frozen confection is removed from the mold. The resultant cavity then is filled with an ingredient, in liquid form, having a different flavor or color, and the entire product then is subjected to additional freezing. This method is ill-suited for mass production.

U.S. Pat. No. 2,674,960 to DePasquale discloses a method for making a frozen confection having a plurality of different flavors or colors. Following partial filling of a first mold with a first ingredient, a second, smaller mold is inserted into the first mold to cause the first ingredient to fill the space between the two molds. The first ingredient then is frozen and the second mold is removed. The resultant cavity in the product then is partially filled with a second ingredient, and the same steps are repeated using a yet smaller mold. This method also is ill-suited for mass production.

U.S. Pat. No. 4,986,080 to Grigoli discloses an apparatus and method for making a frozen confection having a plurality of different flavors or colors. The Grigoli method, however, requires substantial modifications to conventional, frozen-confection manufacturing apparatus. The Grigoli apparatus operates on a double-step principle in which rows of molds advance two-by-two. A first filling unit fills a first row of molds but skips a second row of molds. The ingredients within the molds of the first row then are frozen and, at a first removal and inserting station, the frozen products are removed from these molds and inserted into the molds of the second row. The second molds have a cross-section larger than the first molds such that when the frozen product is inserted into the second molds, space remains between the product and the inner walls of the second molds. A second ingredient in liquid form then is inserted into the second molds to fill these spaces. The second molds are transmitted to a second freezing station, and then to a final withdrawal station where the final product is withdrawn. This double-step method substantially complicates, and increases the expense, of manufacturing a frozen confection.

SUMMARY OF THE INVENTION

The present invention provides an apparatus and method for making a frozen confection having a plurality of distinct, visible, differently flavored or colored sections. Applicants' system and method use conventional, ice cream making equipment and require only the addition of stations to this equipment.

In Applicants' system and method, molds for an ice-cream product are filled with a first ingredient for a first flavor or color and are subjected to freezing in a conventional manner. After the outer layer of this ingredient is substantially frozen, however, but before complete freezing of the product's core, the liquid comprising the core is withdrawn, preferably through vacuuming or similar means. Each mold then is advanced to a carving station where a carving tool, such as a laser, is inserted into the mold's core. This carving tool is programmed to remove a portion of the frozen outer layer of the first ingredient in accordance with a predetermined pattern.

Following carving of the frozen outer layer, the molds are advanced to a second filling station where a second ingredient for a second flavor or color is inserted into the molds. The molds then are moved to a stick inserting station where sticks are inserted into the molds. The frozen confections then are completely frozen at a final freezing station and, at a withdrawal station, the final products are removed from the molds.

By including further intermediate freezing, liquid-withdrawal and carving stations in the process, frozen confections comprising more than two flavored or colored sections can be manufactured. For example, rather than completely freezing the frozen confections at the second freezing station, only partial freezing can occur at this station, followed by a second removal of the unfrozen ingredient within the products' cores. A second carving station then can carve a second pattern through the first or second frozen layers, or both. A third ingredient then can be inserted into the molds, followed by final freezing, to create an intricate pattern of distinct, visible, multiple flavors or colors within a single frozen confection.

In an alternative embodiment, rather than partially freezing the first ingredient and withdrawing the liquid comprising the core of this ingredient, a solid or hollow body is inserted into the mold, either before or after insertion of the first ingredient. This body is shaped in order to be insertable into, and withdrawable from, the mold, and such that, when inserted, a space exists between the inner wall of the mold and the outer surface of the body. The first ingredient, upon insertion into the mold, occupies this space and is frozen. The body then is withdrawn from the mold, preferably by applying heat to thaw the first ingredient in the area immediately adjacent the body's outer surface. Heat may be applied by, for example, moving the molds to a heated environment, passing an electrical current through the body or inserting chemical substances into the body such that a heat-producing reaction occurs.

In another embodiment, rather than using a carving tool to remove a portion of the frozen outer layer of the first ingredient, the body inserted into the mold, or the mold itself, comprises movable projections. Prior to freezing the first ingredient, these projections are extended. Following this freezing, the projections are withdrawn. The body then is withdrawn from the mold, and the second ingredient is inserted.

DETAILED DESCRIPTION OF THE PREFERRED EMBODIMENTS

Figure 1:
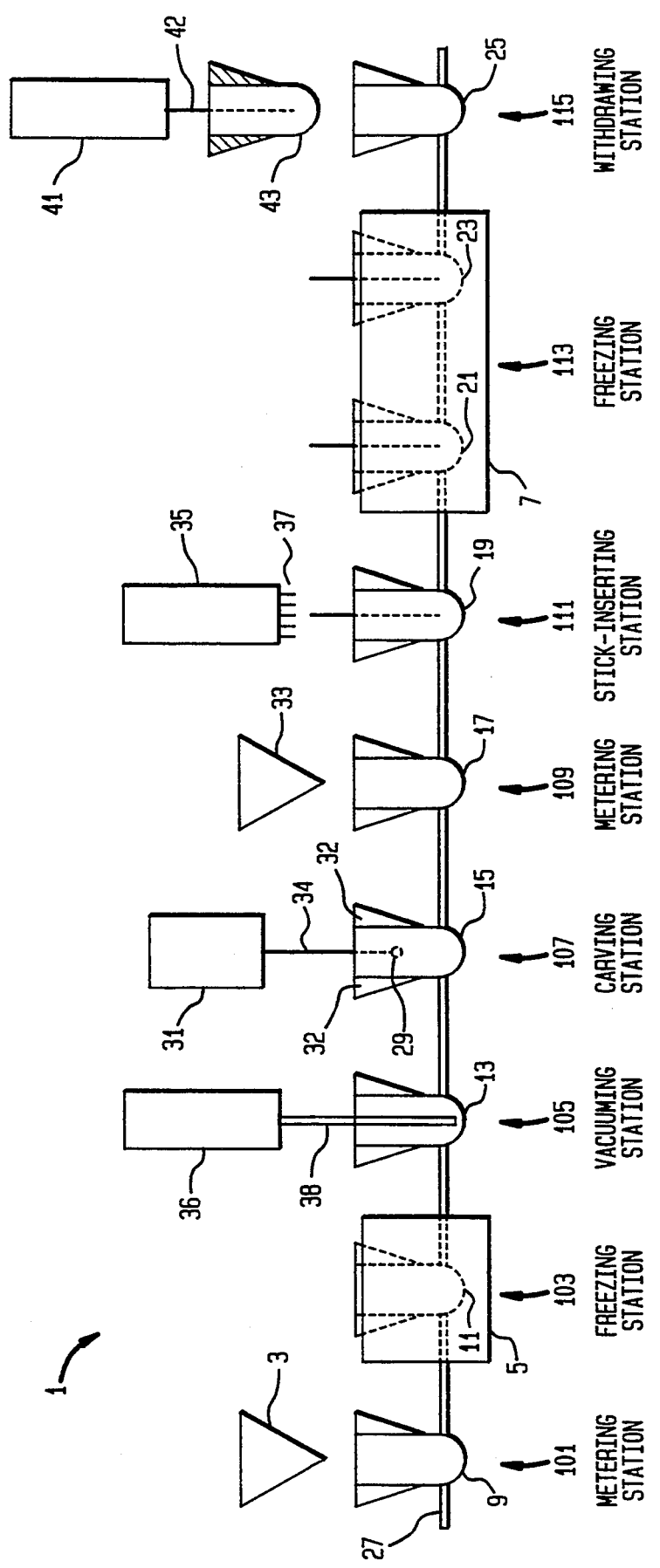
FIG. 1 is a functional block diagram of a frozen confection manufacturing system in accordance with the present invention.

A functional block diagram of a frozen confection manufacturing system in accordance with the present invention is shown in FIG. 1. System 1 comprises a plurality of rows of molds 9, 11, 13, 15, 17, 19, 21, 23 and 25 affixed to rotary table 27. In the alternative, rotary table 27 may comprise an in-line conveyor. Rotary table 27 moves the molds through various stations where various steps in the manufacturing process occur. These stations include metering station 101, freezing station 103, vacuuming station 105, carving station 107, metering station 109, stick-inserting station 111, freezing station 113 and withdrawing station 115.

At metering station 101, filling unit 3 inserts first ingredients in liquid form into the molds. The molds then are transported to freezing station 103 where they enter freezing tank 5. This tank generally contains a brine bath whose temperature is below freezing to cause freezing of the first ingredients. This freezing progresses from the inner walls of the molds into the molds' central cores. Before complete freezing of the central cores, the molds are moved out of freezing tank 5 to vacuuming station 105.

At vacuuming station 105, vacuum unit 36 inserts hose 38 into the molds. Following this insertion, vacuum unit 36 withdraws the unfrozen liquid comprising the molds' central cores. Following this removal, the molds are moved to carving station 107.

Carving station 107 comprises means for removing a portion of the outer, frozen layer of the first ingredients within the molds. These means include laser 29 attached to robotic arm 34. The laser and arm are controlled by computerized, laser-control system 31. In the alternative, laser 29 can be a mechanical carving device, such as a knife or similar instrument.

Laser-control system 31 is programmed to insert laser 29 into the molds, activate laser 29 at appropriate times and move laser 29 in a predetermined pattern to remove predetermined portions of the frozen outer layer of the first ingredient. Programming for such activation and robotic movement is well known in the art. In this case, laser 29 is programmed to remove the frozen outer layer adjacent wing-sections 32 of the molds. Upon completion of this removal, laser-control system 31 causes arm 34 and laser 29 to move out of the molds. The molds then are moved to metering station 109.

At metering station 109, filling unit 33 inserts second ingredients, different in color and/or flavor from the first ingredients, into the molds in the same manner as at metering station 101. These second ingredients fill the cores of the molds and also the portions of the frozen outer layers of the first ingredients adjacent the molds' wing sections 32. The molds then are moved to stick-inserting station 111.

At stick-inserting station 111, stick-inserting unit 35 inserts into each of the molds one of conventional plastic or wooden sticks 37. The molds then are moved to freezing station 113.

In a process similar to that at freezing station 103, freezing station 113 contains a freezing tank 7 with a brine solution kept at a temperature below freezing. The molds within freezing tank 7 remain surrounded by the brine solution until all of the ingredients within the molds are completely frozen.

Final, two-flavored frozen confection 43 is withdrawn from the molds at withdrawing station 115. Withdrawing unit 41 grasps the sticks within the frozen confections, e.g., stick 42, and pulls the frozen confections from the molds. In order to facilitate this process, the frozen ingredients within the molds may be slightly thawed, through the use of warm water or other means, prior to withdrawing the product.

Figure 3:
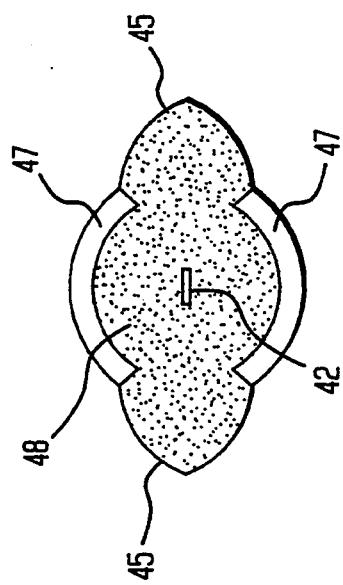
FIG. 3 is a bottom view of the multiply flavored or colored frozen confection of FIG. 2.
Figure 2:
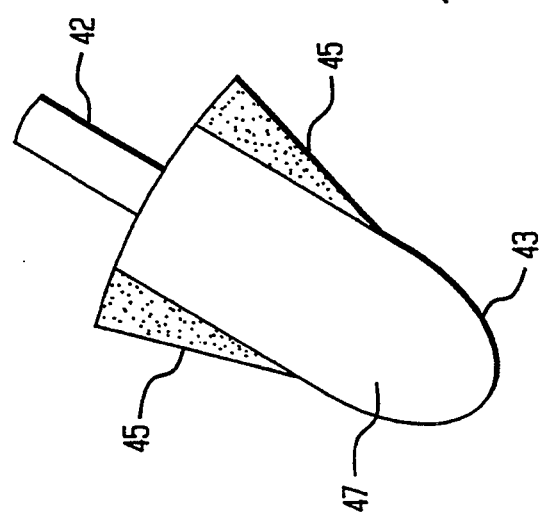
FIG. 2 shows in perspective view a multiply flavored or colored frozen confection manufactured using the system of FIG. 1.

Two-flavored frozen confection 43 is shown in greater detail in FIGS. 2 and 3. As shown in these figures, frozen-confection 43 comprises distinct, visible sections, each comprising a different flavor and/or color. Outer main section 47 consists of the ingredients entering the molds at metering station 101, and wing-sections 45 and inner core 48 consist of the ingredients entering the molds at metering station 109. As explained above, when the second ingredients enter the molds, they fill wing-sections 32 and the molds' central core.

Figure 4:
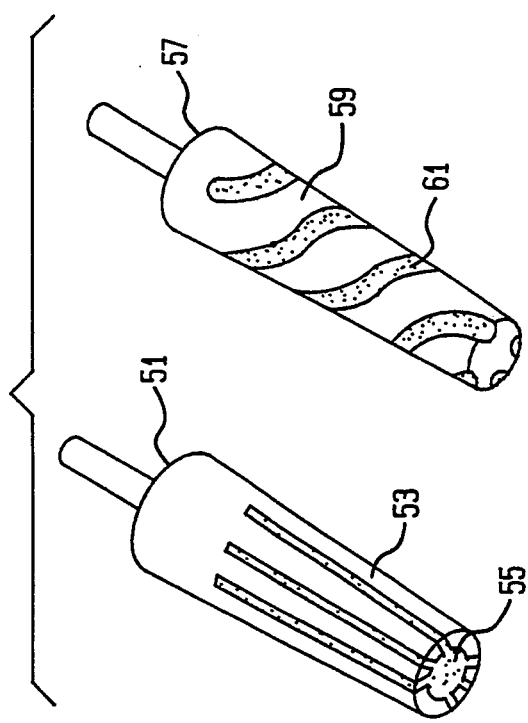
FIG. 4 shows other multiply flavored or colored frozen confections that can be manufactured in accordance with the present invention.

FIG. 4 shows examples of other two-flavored frozen confections that can be manufactured using the system and method of the invention. The manufacture of these frozen confections requires only the use of different molds on system 1 and reprogramming of laser-control system 31. Two-flavored frozen confections 51 and 57 comprise, respectively, first sections 53 and 59 and second sections 55 and 61. The ingredients comprising sections 53 and 59 enter the molds at metering station 101, and the ingredients comprising sections 55 and 61 enter the molds at metering station 109.

The ingredients comprising the frozen confections' second sections, e.g., sections 55 and 61 of frozen confections 51 and 57, respectively, include the first ingredients removed at carving station 107 which melt into the cores of the molds. If these removed portions are small in volume, they have an insignificant effect upon the flavor and/or color of the second ingredients. If desired, however, a second vacuuming station can be inserted on system 1 after the first carving station to remove these melted first ingredients.

Also, by including within system 1 further intermediate freezing, liquid-withdrawing and carving stations, frozen confections comprising more than two flavored or colored sections can be manufactured. For example, rather than completely freezing the frozen confection at freezing station 113, only partial freezing can occur at this station, followed by removal of the unfrozen second ingredients. A second carving station then can be used to carve a second pattern within the first or second frozen layers, or both, to create an intricate pattern of distinct, visible, sections of flavors or colors within a single frozen confection.

Figure 6:
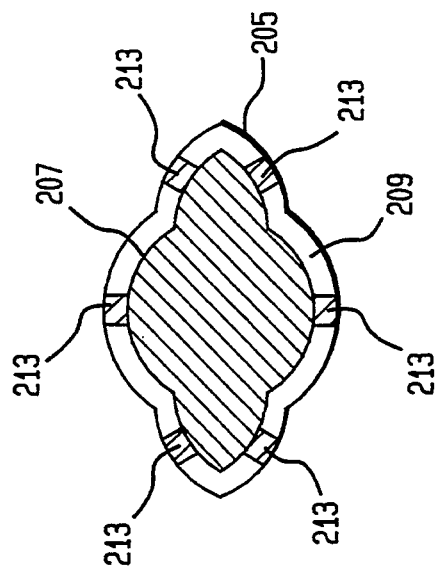
FIG. 6 is a cross-section of the mold and inner-mold body shown in FIG. 5.
Figure 5:
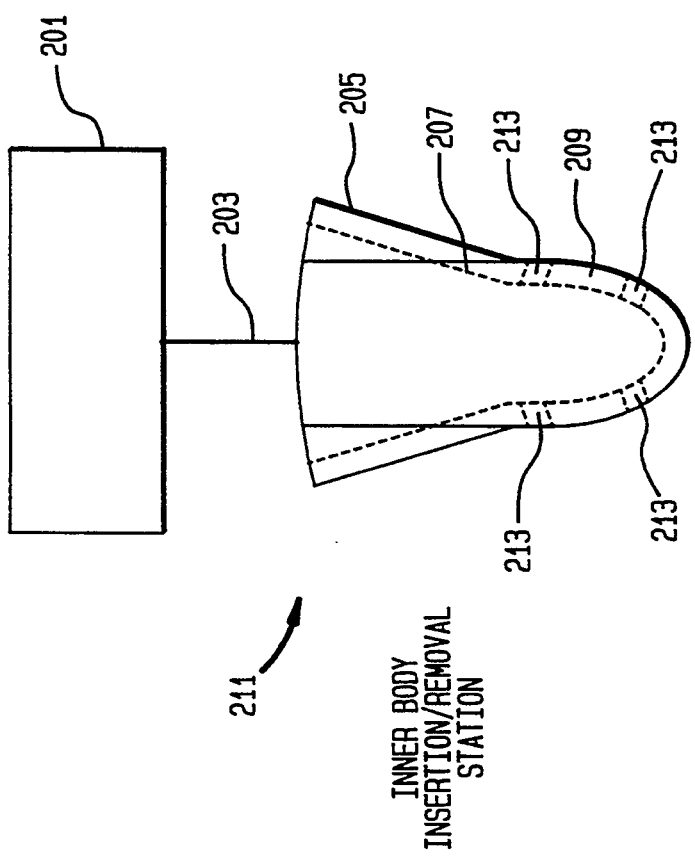
FIG. 5 is a functional block diagram of a frozen confection manufacturing station in accordance with a second embodiment of the present invention.

A second embodiment of the present invention is shown in FIGS. 5 and 6. In this embodiment, rather than partially freezing the first ingredients at freezing station 103 and withdrawing the unfrozen liquid comprising the molds' central cores at vacuuming station 105, system 1 incorporates inner body insertion/removal station 211. This station may be part of freezing station 103.

In accordance with this second embodiment, inner-body control system 201 inserts an inner body 207 into mold 205 using robotic arm 203. The molds are filled only partially with the first ingredients at metering station 101 in order that this insertion does not cause spilling of the first ingredients from the molds but causes these ingredients to occupy space 209 between the inner wall of mold 205 and the outer surface of inner body 207. The molds then are subjected to freezing temperatures to freeze the first ingredients, and, following this freezing, inner-body control system 201 withdraws inner body 207 from the mold. This withdrawal may be facilitated by applying heat from an electrical circuit (not shown), within inner body 207 and activated by inner-body control system 201. This heat causes thawing of the first ingredients in the area immediately adjacent the outer surface of inner body 207. In the alternative, heat may be applied directly to the molds or chemical substances may be inserted into a cavity within inner body 207 to cause a heat-producing reaction.

Following removal of inner body 207, the molds may be moved to carving station 107 where a pattern is carved in the frozen first ingredients in the same manner as described above. In the alternative, inner body 207, or mold 205, may incorporate movable projections 213. Prior to freezing the first ingredients, inner-body control system 201 causes these projections to extend into space 209. Following this freezing, inner-body control system 201 causes these projections to withdraw from this space. Movement of the projections may be effected mechanically, pneumatically or through other means well-known in the art. If the movable projections are incorporated into the inner body, they may be constructed to collapse (fold) against the movable body in response to its withdrawal. If the movable projections move into, and out of, either the inner body or the mold, the inner body or mold also may be covered with a thin layer of a resiliently deformable, elastomeric material, such as silicone rubber, to both seal the body or mold and permit extension and withdrawal of the projections. Following withdrawal of projections 213 from space 209 and withdrawal of inner body 207 from mold 205, the second ingredients are inserted into the mold. The remaining steps in the manufacturing process are the same as those described above.

Although particular embodiments of the present invention have been shown and described, many varied embodiments incorporating the teachings of the present invention easily may be constructed by those skilled in the art. For example, depending upon the construction of the laser or other carving tool and the particular portions of the frozen first ingredients for which removal is desired (such as only along the mold's lower portions), insertion of the laser into the mold itself may be unnecessary.

What is claimed is:

1. A method for making a frozen confection having a plurality of differently flavored or colored sections, comprising:
   (a) inserting a first liquid comprising the ingredients of a first flavor or color into a mold;
   (b) partially freezing said first liquid such that said first liquid comprises a substantially frozen first outer layer and a substantially liquid first inner core;
   (c) withdrawing from said mold the liquid comprising said first inner core;
   (d) removing with a carving tool a portion of said first outer layer;
   (e) inserting a second liquid comprising the ingredients of a second flavor or color into said mold; and
   (f) freezing said second liquid.

2. A method as in claim 1, further comprising:
   (a) partially freezing said second liquid such that said second liquid comprises a substantially frozen second outer layer and a substantially liquid second inner core;
   (b) withdrawing from said mold the liquid comprising said second inner core;
   (c) removing with a carving tool a portion of said first or second outer layer;
   (d) inserting a third liquid comprising the ingredients of a third flavor or color into said mold; and
   (e) freezing said third liquid.

3. A method as in claim 1, wherein said carving tool comprises a laser and further comprising causing said laser to carve a pre-determined pattern in said first outer layer.

4. A method as in claim 1, wherein said carving tool comprises a mechanical cutting tool and further comprising causing said mechanical cutting tool to carve a pre-determined pattern in said first outer layer.

5. A method as in claim 1, wherein said step of removing comprises inserting said carving tool into a space within said mold previously occupied by said first inner core.

6. A method as in claim 1, wherein said step of substantially withdrawing comprises vacuuming from said mold the liquid comprising said first inner core.

7. A system for making a frozen confection having a plurality of differently flavored or colored sections, comprising:
   (a) means for inserting a first liquid comprising the ingredients for a first flavor or color into a mold;
   (b) means for partially freezing said first liquid such that said first liquid comprises a substantially frozen first outer layer and a substantially liquid first inner core;
   (c) means for withdrawing from said mold the liquid comprising said first inner core;
   (d) a first carving tool;
   (e) means for removing with said first carving tool a portion of said first outer layer;
   (f) means for inserting a second liquid comprising the ingredients of a second flavor or color into said mold; and
   (g) means for freezing said second liquid.

8. A system as in claim 7, further comprising:
   (a) means for partially freezing said second liquid such that said second liquid comprises a substantially frozen second outer layer and a substantially liquid second inner core;
   (b) means for withdrawing from said mold the liquid comprising said second inner core;
   (c) a second carving tool;
   (d) means for removing with said second carving tool a portion of said first or second outer layer;
   (e) means for inserting a third liquid comprising the ingredients of a third flavor or color into said mold; and
   (f) means for freezing said third liquid.

9. A system as in claim 7, wherein said first carving tool comprises a laser and further comprising means for causing said laser to carve a pre-determined pattern in said first outer layer.

10. A system as in claim 7, wherein said first carving tool comprises a mechanical cutting tool and further comprising means for causing said mechanical cutting tool to carve a pre-determined pattern in said first or second outer layer.

11. A system as in claim 7, wherein said means for removing comprises means for inserting said first carving tool into a space within said mold previously occupied by said first inner core.

12. A system as in claim 7, wherein said means for withdrawing comprises a vacuum.

13. A method for making a frozen confection having a plurality of differently flavored or colored sections, comprising:
   (a) inserting a first liquid comprising the ingredients of a first flavor or color into a mold;
   (b) inserting a first body into said mold such that said first liquid occupies a space between the inner wall of said mold and the outer surface of said first body;
   (c) freezing said first liquid such that said first liquid comprises a substantially frozen first outer layer;
   (d) withdrawing said first body from said mold;
   (e) removing with a carving tool a portion of said first outer layer;
   (f) inserting a second liquid comprising the ingredients of a second flavor or color into said mold; and
   (g) freezing said second liquid.

14. A method as in claim 13, further comprising:
   (a) inserting a second body into said mold, prior to said freezing of said second liquid, such that second liquid occupies a space between the inner wall of said first outer layer and the outer surface of said second body;
   (b) freezing said second liquid such that said second liquid comprises a substantially frozen second outer layer;
   (c) withdrawing said second body from said mold;
   (d) removing with a carving tool a portion of said first or second outer layer;
   (e) inserting a third liquid comprising the ingredients of a third flavor or color into said mold; and
   (f) freezing said third liquid.

15. A method as in claim 13, wherein said first carving tool comprises a laser and further comprising causing said laser to carve a pre-determined pattern in said first outer layer.

16. A method as in claim 13, wherein said carving tool comprises a mechanical cutting tool and further comprising causing said mechanical cutting tool to carve a pre-determined pattern in said first outer layer.

17. A method as in claim 13, wherein said step of removing comprises inserting said carving tool into a space within said mold previously occupied by said first body.

18. A method as in claim 13, wherein said step of withdrawing said first body comprises applying heat to said first body to cause thawing of said first outer layer in an area adjacent said first body.

19. A system for making a frozen confection having a plurality of differently flavored or colored sections, comprising:
   (a) means for inserting a first liquid comprising the ingredients of a first flavor or color into a mold;
   (b) means for inserting a first body into said mold such that said first liquid occupies a space between the inner wall of said mold and the outer surface of said first body;
   (c) means for freezing said first liquid such that said first liquid comprises a substantially frozen first outer layer;
   (d) means for withdrawing said first body from said mold;
   (e) a first carving tool;
   (f) means for removing with said first carving tool a portion of said first outer layer;
   (g) means for inserting a second liquid comprising the ingredients of a second flavor or color into said mold; and
   (h) means for freezing said second liquid.

20. A system as in claim 19, further comprising:
   (a) means for inserting a second body into said mold, prior to said freezing of said second liquid, such that said second liquid occupies a space between the inner wall of said first outer layer and the outer surface of said second body;
   (b) means for freezing said second liquid such that said second liquid comprises a substantially frozen second outer layer;
   (c) means for withdrawing said second body from said mold;
   (d) a second carving tool;
   (e) means for removing with said second carving tool a portion of said first or second outer layer;
   (f) means for inserting a third liquid comprising the ingredients of a third flavor or color into said mold; and
   (g) means for freezing said third liquid.

21. A system as in claim 19, wherein said first carving tool comprises a laser and further comprising means for causing said laser to carve a pre-determined pattern in said first outer layer.

22. A system as in claim 19, wherein said first carving tool comprises a mechanical cutting tool and further comprising means for causing said mechanical cutting tool to carve a pre-determined pattern in said first outer layer.

23. A system as in claim 19, wherein said means for removing comprises means for inserting said first carving tool into a space within said mold previously occupied by said first body.

24. A system as in claim 19, further comprising means for applying heat to said first body to cause thawing of said first outer layer in an area adjacent said first body.

25. A method for making a frozen confection having a plurality of differently flavored or colored sections, comprising:
   (a) providing a mold having movable projections on its inner wall;
   (b) inserting a first liquid comprising the ingredients of a first flavor or color into said mold;
   (c) inserting a body into said mold such that said first liquid occupies a space between the inner wall of said mold and the outer surface of said body;
   (d) freezing said first liquid such that said first liquid comprises a substantially frozen outer layer;
   (e) withdrawing said body from said mold;
   (f) moving said projections toward the inner wall of said mold;
   (g) inserting a second liquid comprising the ingredients of a second flavor or color into said mold; and
   (h) freezing said second liquid.

26. A system for making a frozen confection having a plurality of differently flavored or colored sections, comprising:
   (a) a mold having movable projections on its inner wall;
   (b) means for inserting a first liquid comprising the ingredients of a first flavor or color into said mold;
   (c) means for inserting a body into said mold such that said first liquid occupies a space between the inner wall of said mold and the outer surface of said body;
   (d) means for freezing said first liquid such that said first liquid comprises a substantially frozen first outer layer;
   (e) means for withdrawing said body from said mold;
   (f) means for moving said projections toward the inner wall of said mold;
   (g) means for inserting a second liquid comprising the ingredients of a second flavor or color into said mold; and
   (h) means for freezing said second liquid.

27. A method for making a frozen confection having a plurality of differently flavored or colored sections, comprising:
   (a) inserting a first liquid comprising the ingredients of a first flavor or color into a mold;
   (b) providing a body having movable projections on its outer surface;
   (c) inserting said body into said mold such that said first liquid occupies a space between the inner wall of said mold and the outer surface of said body;
   (d) freezing said first liquid such that said first liquid comprises a substantially frozen first outer layer;
   (e) moving said projections toward said body;
   (f) withdrawing said body from said mold;
   (g) inserting a second liquid comprising the ingredients of a second flavor or color into said mold; and
   (h) freezing said second liquid.

28. A system for making a frozen confection having a plurality of differently flavored or colored sections, comprising:
   (a) means for inserting a first liquid comprising the ingredients of a first flavor or color into a mold;
   (b) a body having movable projections on its outer surface;
   (c) means for inserting said body into said mold such that said first liquid occupies a space between the inner wall of said mold and the outer surface of said body;
   (d) means for freezing said first liquid such that said first liquid comprises a substantially frozen first outer layer;
   (e) means for moving said projections toward said body;
   (f) means for withdrawing said body from said mold;
   (g) means for inserting a second liquid comprising the ingredients of a second flavor or color into said mold; and
   (h) means for freezing said second liquid.

* * * * *